(12) United States Patent
Dong

(10) Patent No.: US 6,278,817 B1
(45) Date of Patent: Aug. 21, 2001

(54) ASYMMETRIC LOW DISPERSION BRAGG GRATING FILTER

(75) Inventor: Liang Dong, Painted Post, NY (US)

(73) Assignee: Corning, Incorporated, Corning, NY (US)

( * ) Notice: Subject to any disclaimer, the term of this patent is extended or adjusted under 35 U.S.C. 154(b) by 0 days.

(21) Appl. No.: 09/386,622

(22) Filed: Aug. 31, 1999

(51) Int. Cl.$^7$ .................................................. G02B 6/34
(52) U.S. Cl. .......................................... 385/37; 385/129
(58) Field of Search ........................................ 385/37, 129

(56) References Cited

U.S. PATENT DOCUMENTS

| | | |
|---|---|---|
| 5,007,705 | 4/1991 | Morey et al. . |
| 5,218,651 | 6/1993 | Faco et al. . |
| 5,351,321 | 9/1994 | Snitzer et al. . |
| 5,363,239 | 11/1994 | Mizrahi et al. . |
| 5,602,949 | 2/1997 | Epworth . |
| 5,636,304 | 6/1997 | Mizrahi et al. . |
| 5,757,487 * | 5/1998 | Kersey ................................. 356/345 |
| 5,818,987 | 10/1998 | Bakhti et al. . |
| 5,852,690 * | 12/1998 | Haggans et al. ......................... 385/37 |
| 6,067,391 * | 5/2000 | Land ...................................... 385/27 |
| 6,104,852 * | 8/2000 | Kashyap ................................ 385/123 |

OTHER PUBLICATIONS

Group–delay reconstruction for fiber Bragg gratings in reflection and transmission; Poladian; Oct. 1997; p. 1571–1573.

Dispersive Properties of Optical Filters for WDM Systems; Lenz/Eggleton/Giles/Madsen/Slusher; Aug. 1998; p. 1390–1402.

Fibre Bragg grating transmission filters with near-ideal filter response; Chen/Smith; Sep. 1998.

Dispersion Penalty Measurements of Narrow Fiber Bragg Gratings at 10 Gb/s; Nykolak/Eggleton/Lenz/Strasser; Sep. 1998; p. 1319–1321.

Optimised square passband fibre Bragg grating filter with in-band flat group delay response; Ibsen/Durkin/Cole/Laming; Apr. 1998.

* cited by examiner

*Primary Examiner*—Frank G. Font
*Assistant Examiner*—Layla Lauchman
(74) *Attorney, Agent, or Firm*—Harness, Dickey & Pierce, P.L.C.

(57) ABSTRACT

A Bragg grating filter is provided for use in an optical fiber of an optical fiber system. The optical fiber includes a core and a cladding. A plurality of Bragg grating segments are formed into the core of the optical fiber. Each grating element is defined by periodic variations in the refractive index. The period variations in the refractive index have a spatially asymmetric index of modulation, such that dispersion of the reflection at one end of the grating element can be decreased at the expense of increased dispersion of reflection at the other end of the grating element.

11 Claims, 9 Drawing Sheets

ASYMMETRIC LOW DISPERSION BRAGG GRATING FILTER

BACKGROUND OF THE INVENTION

1. Field of the Invention

The present invention relates generally to reflective optical filters, and particularly to an asymmetric low dispersion Bragg grating filter.

2. Technical Background

Wavelength division multiplexing (WDM) is pervasive in optical communication systems. Key optical components in these optical system are those that perform the functions of combining different wavelength channels and splitting wavelength channels.

Bragg grating structures are useful as spectral filters for WDM and other optical signal processing applications. In these types of applications, the Bragg grating filters should have low insertion loss, a flat-top spectral response, steep slopes to minimize crosstalk and a linear phase response to avoid transmission penalties due to signal degradation arising from filter dispersion. Although a reflection filter based on Bragg gratings can be designed to have a near-ideal spectral response, the corresponding phase response becomes increasingly nonlinear (i.e., increased dispersion) as the band edges are approached, thereby reducing the useful filter bandwidth. While the amplitude response of such optical filters has received much attention, the phase response has only recently been investigated in the context of optical communication systems.

Reflective filters based on conventional Bragg gratings have dispersion characteristics which are determined by the transmission spectrum of the grating through a relation which is dictated by causality of such filters. As a consequence of this, a band-pass filter with sharp falling edge in spectrum will suffer a larger in-band dispersion. The in-band dispersion is typically worst towards the edge of the band. In this case, the filter exhibits an effective dispersion-limited filter bandwidth less than the bandwidth of a conventional amplitude-limited filter. However, for a fixed amplitude response in a Bragg grating filter, dispersion of the filter can be improved over the causality-defined dispersion limit. Since reflective filters generally use only reflection from one end of the Bragg grating, dispersion of the reflection can be decreased at one end of the grating at the expense of increased dispersion at the other end of the grating. This unique feature of the Bragg grating is very profound, since it opens a way to make a dispersionless ideal filter which can play a very important role in the field of optical communications.

SUMMARY OF THE INVENTION

One aspect of the present invention is a Bragg grating filter for use in an optical fiber of an optical fiber system, where the optical fiber includes a core and a cladding. A plurality of Bragg grating segments are formed into the core and/or at least part of the cladding of the optical fiber. Each grating element is defined by periodic variations in the refractive index. The periodic variations in the refractive index have a spatially asymmetric index of modulation such that dispersion of the reflection at one end of the grating element can be decreased at the expense of increased dispersion of reflection at the other end of the grating element.

Additional features and advantages of the invention will be set forth in the detailed description which follows, and in part will be readily apparent to those skilled in the art from that description or recognized by practicing the invention as described in the deatiled descriptions which follows, the claims as well as the appended drawings.

It is to be understood that both the foregoing general description and the following deatiled description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

Figure 1:
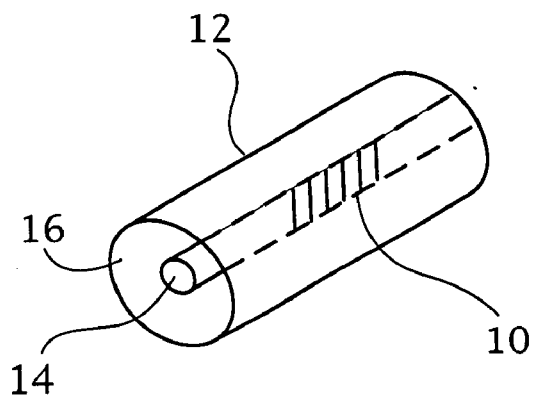
FIG. 1 is a perspective view of an optical fiber having a Bragg grating formed therein in accordance with the present invention.

Reference will now be made in detail to the presently preferred embodiments of the invention, examples of which are illustrated in the accompanying drawings. Whenever possible, the same reference numerals will be used throughout the drawings to refer to the same or like parts.

An exemplary embodiment of a Bragg grating 10 of the present invention is shown in FIG. 1. For purposes of this discussion, the Bragg grating 10 is formed in an optical fiber 12. The optical fiber 12 includes a core 14 and a cladding 16 which encases the core 14 of the fiber 12. The core 14 and/or at least part of the cladding of the optical fiber 12 are comprised of a material which exhibits change in its refractive index when exposed to radiation of a particular frequency. Thus, the Bragg grating 10 is formed in the core 14 of the optical fiber 12 by creating periodic variations in the refractive index of the core 14. As will be apparent to one skilled in the art, various methods are known for forming the Bragg grating into the core 14 of the optical fiber 12. It should also be noted that the Bragg grating can be formed in other optical media and/or components.

Figure 2:
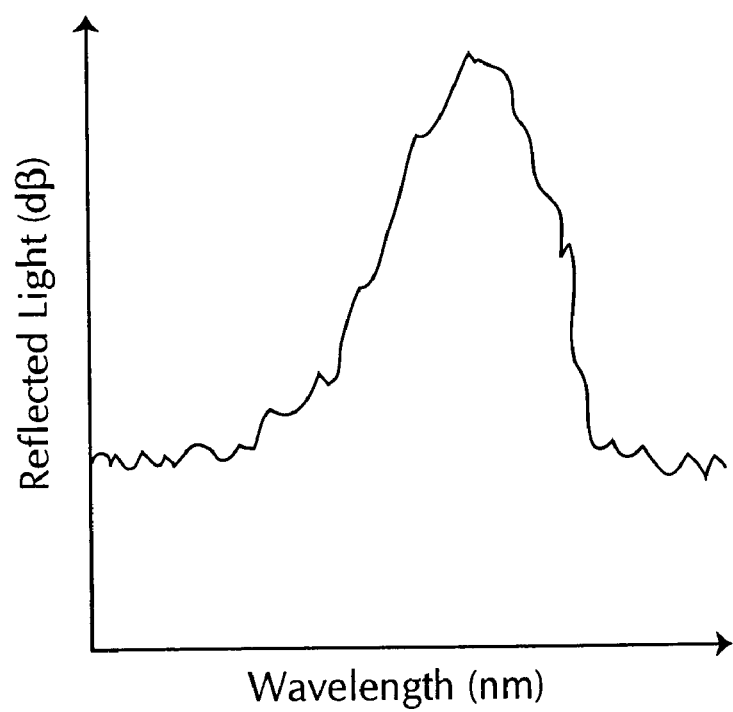
FIG. 2 is a diagram illustrating the reflective characteristics of the Bragg grating of the present invention.
Figure 3:
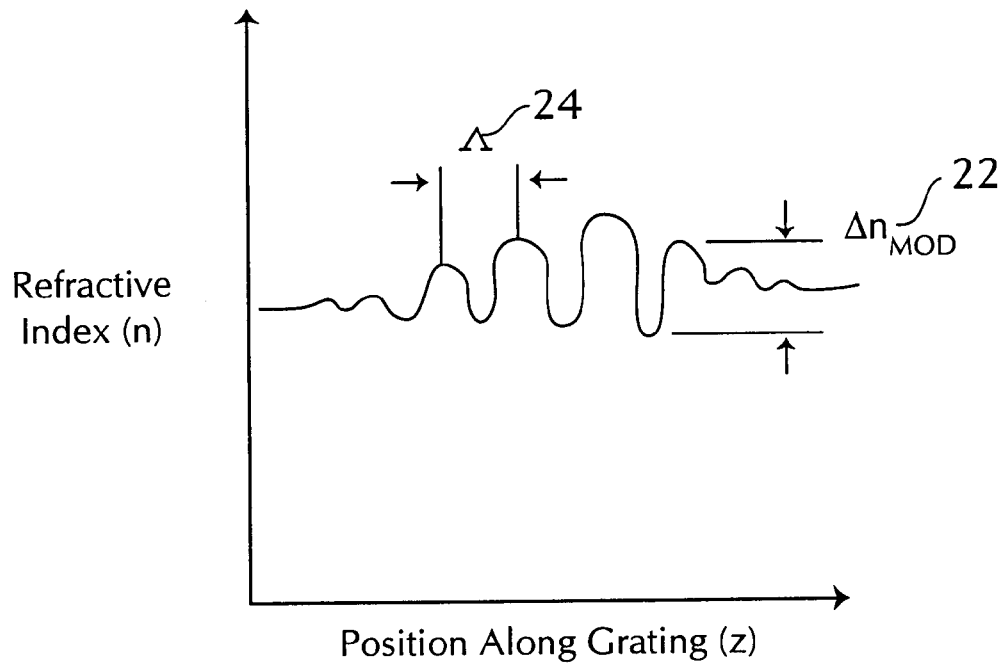
FIG. 3 is a diagram illustrating the refractive index for a conventional Bragg grating structure.
Figure 4:
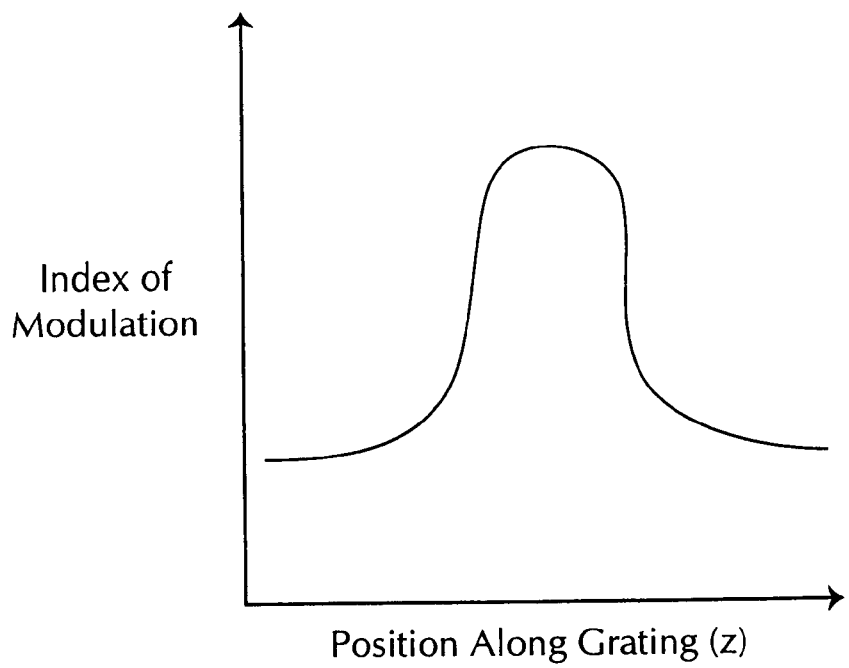
FIG. 4 is a diagram illustrating a spatially symmetric profile for the index modulation for the conventional Bragg grating structure.

A reflective type Bragg grating reflects a specific wavelength while transmitting other wavelengths as shown in FIG. 2, an exemplary plot of reflected light vs. wavelength for a typical Bragg grating. As previously noted, the Bragg grating is defined by the periodic variations (or the pattern of perturbations) in the refractive index. FIG. 3 illustrates an exemplary variation in the refractive index for a conventional Bragg grating. As is well known, any type of grating can primarily be described by two parameters: (1) the amplitude of the refractive grating and (2) the period of the refractive grating. The amplitude 22 indicates how much the refractive index has changed locally, whereas the period 24 indicates how far apart the amplitude peaks are from each other. FIG. 4 illustrates the corresponding index of modulation for the Bragg grating. The index of modulation is also representative of the grating. It is noteworthy that a conventional Bragg grating essentially exhibits a spatially symmetric profile.

A reflective spectral filter can be constructed using a plurality of Bragg grating elements, where each grating element has a different periodic variation in the refractive index. Each Bragg grating element reflects a different wavelength, thereby forming the filter. Reflective filters based on conventional Bragg grating elements with a symmetric structure have their dispersion characteristics determined by the transmission spectrum of the grating through a relation which is dictated by causality of such filters. As a consequence, a band-pass filter with sharp falling edges in spectrum will suffer larger in-band dispersion. In an ideal band-pass filter, sharp falling edges and low in-band dispersion are both desired.

In a conventional reflective Bragg grating filter, the in-band dispersion is typically worse towards the edge of the band. In this case, the filter exhibits an effective dispersion-limited filter bandwidth less than the conventional amplitude-limited filter bandwidth. However, in accordance with the present invention, the dispersion of the filter can be improved over the causality-defined dispersion limit for a fixed amplitude response. Since most reflective filters uses only reflection from one end of the Bragg grating, dispersion of the reflection can be decreased at one end of the grating at the expense of increased dispersion at the other end of the grating.

In a typical Bragg grating, transmission delay, $D_T(\omega)$, is related to transmission, $T(\omega)$, through Hilbert transform, as follows:

$$D_T(\omega) - D_0 = \frac{1}{\pi} \int_{-\infty}^{\infty} \frac{\partial \log\sqrt{T(\omega)}}{\partial \omega} \frac{d\omega}{\omega - \omega},$$

where $\omega$ is optical frequency, and $D_O$ represents a constant offset. The transmission delay, $D_T(\omega)$, is fundamentally related to the delays of the reflections from two ends of the same grating, $D_f(\omega)$ and $D_b(\omega)$, respectively, by:

$$\frac{D_f(\omega) + D_b(\omega)}{2} = D_T(\omega)$$

When the index of modulation for the grating is spatially symmetric, there is no difference as to which end of the grating light is reflected from, i.e., $D_f(\omega)=D_b(\omega)=D_T(\omega)$. In this case, the dispersion characteristics of the Bragg grating filter is entirely determined by the transmission, $T(\omega)$. To be complete, the amplitude of the reflections from two ends of the Bragg grating, $R_f(\omega)$ and $R_b(\omega)$, respectively, are always equal and related by:

$$R_f(\omega)=R_b(\omega)=1-T(\omega),$$

regardless of the grating structure.

However, if the spatial symmetry of the index for the grating is broken, then $D_f(\omega) \neq D_b(\omega)$. More specifically, the reflection delay can be decreased at one end of the grating at the expense of an increased delay associated with the other end of the grating. Since most reflective filters are single sided (i.e., only one reflection is used), this does not present a problem in terms of device applications. One skilled in the art will readily recognize that the spatially asymmetrical grating (with no chirp) will still have a symmetric reflection and transmission spectrum.

Figure 5:
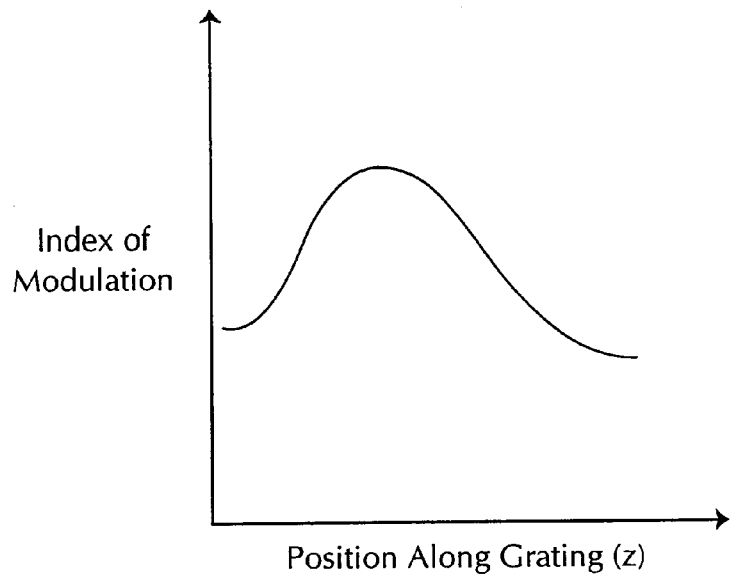
FIG. 5 is diagram illustrating a spatially asymmetric profile for the index modulation for the Bragg grating in accordance with the present invention.

FIG. 5 illustrates an exemplary index of modulation for a Bragg grating filter that exhibits a spatially asymmetric profile. An apodization function is generally a technique for modifying the amplitude transmittance of an optical system so as to reduce or suppress the energy of the diffraction rings relative to that of the central Airy disk. In this case, the index modulation is studied by using an apodization function which allows a certain degree of independent control over both the shape of the index and the degree of asymmetry (i.e., how much the index modulation peak is offset from center of the grating). The index modulation is a function of the position along the grating, z, as follows:

$$q(z) = \left(\frac{z+L}{L}\right)^\alpha \kappa \left(\frac{10^{-7}}{\kappa}\right)^{\left(\frac{|z|}{L}\right)^{2\beta}},$$

where L is the total grating length (e.g., L=5 mm) and $\kappa$ is the coupling coefficient at z=0 (e.g., $\kappa=\pi 7\times10^{-4}/1550$). Accordingly, $\alpha$ is used to control the shape of the apodization and $\beta$ is used to control the peak position of the index modulation.

Figure 6:
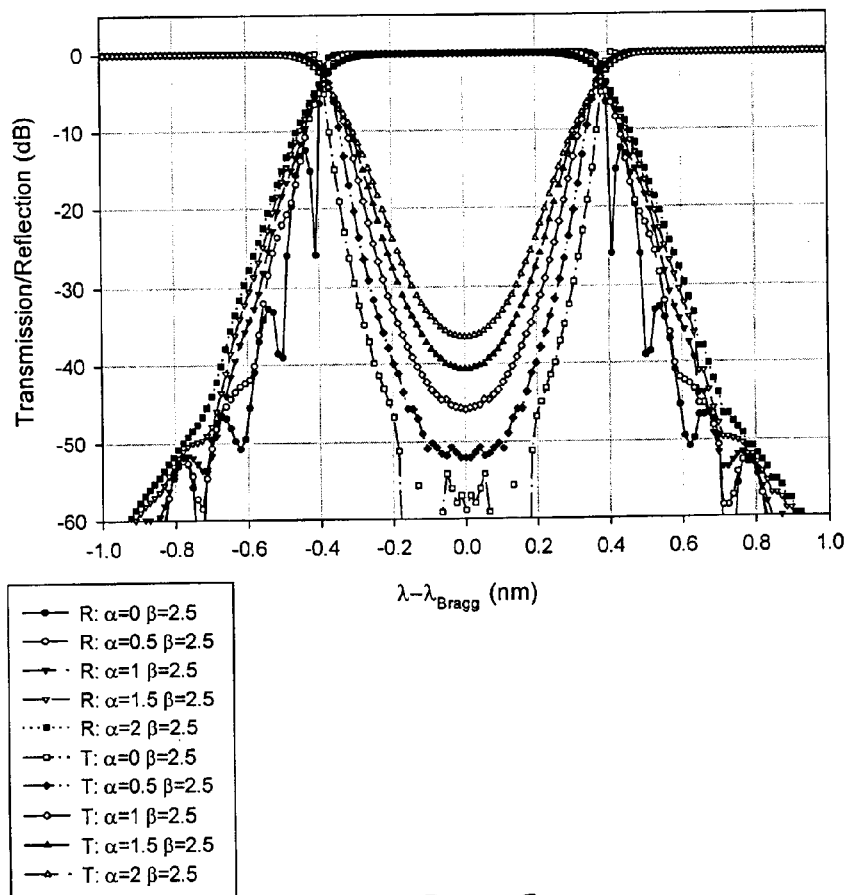
FIG. 6 is a chart showing the transmission and reflection spectrum for different Bragg grating structures in accordance with the present invention.
Figure 7:
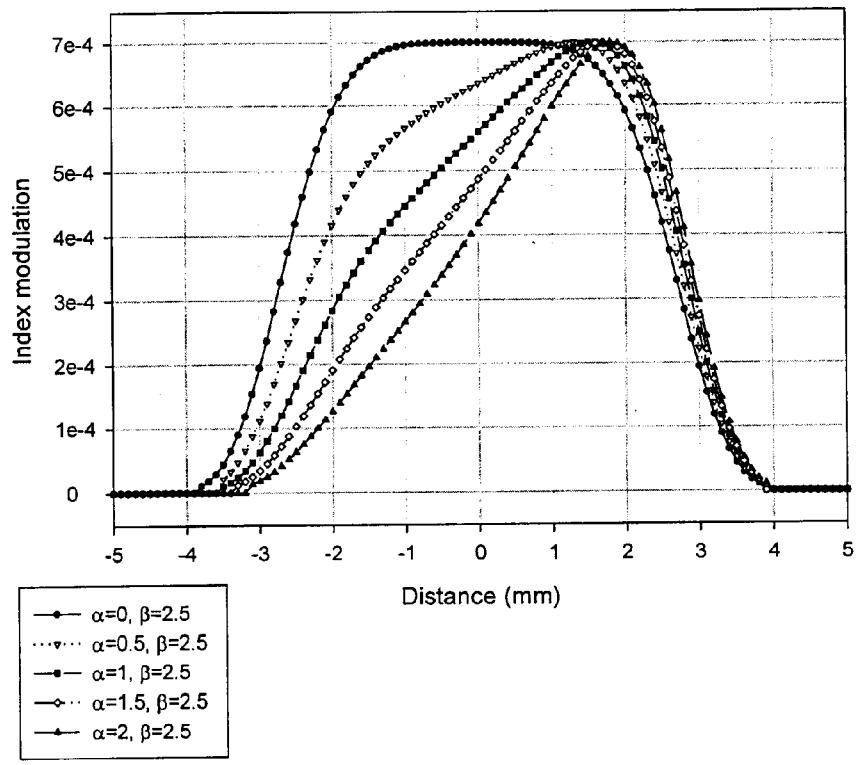
FIG. 7 illustrates how the shape of the index modulation can be changed in accordance with the present invention.

FIG. 6 provides the transmission and reflection spectrum for five exemplary grating structures (where $\beta$ is fixed at 2.5). Asymmetry in the grating structure does not introduce significant changes in terms of the shape of the amplitude fall-off on either side of the filter spectrum. However, the delay exhibited by each grating varies as the shape of the index modulation is changed. For instance, FIG. 7 gives the index modulation profile of a Bragg grating while $\alpha$ is changed from 0 to 2 with $\beta$ fixed at 2.5. As shown, the shape of the index modulation varies while the index modulation peak is more or less fixed. In particular, a larger $\alpha$ represents a more asymmetric grating structure.

Figure 8:
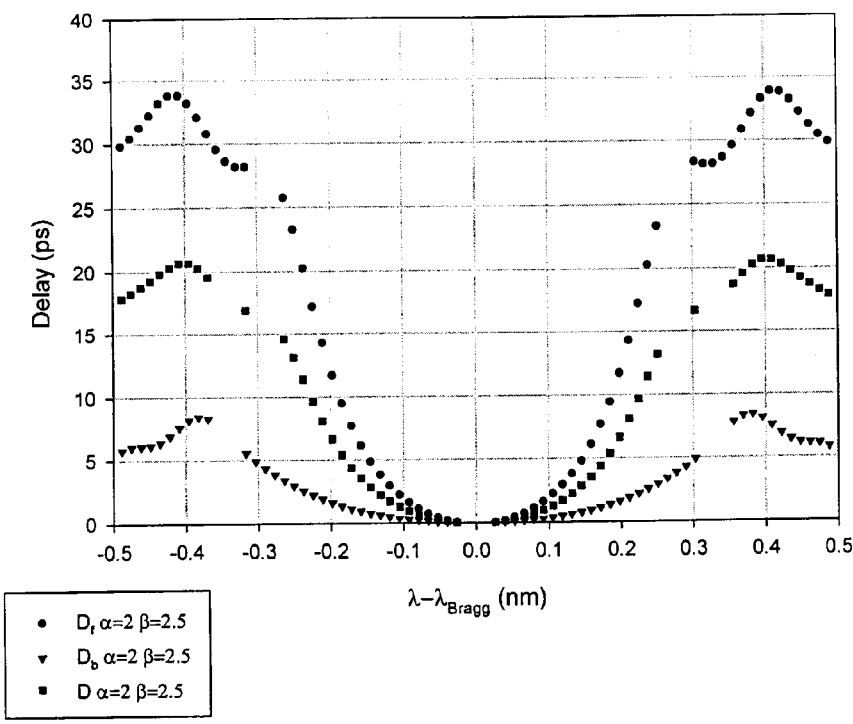
FIGS. 8, 9, 10 and 11 illustrate how the change in the shape of the index modulation causes a variation in the delay exhibited by the Bragg grating structure in accordance with the present invention.
Figure 9:
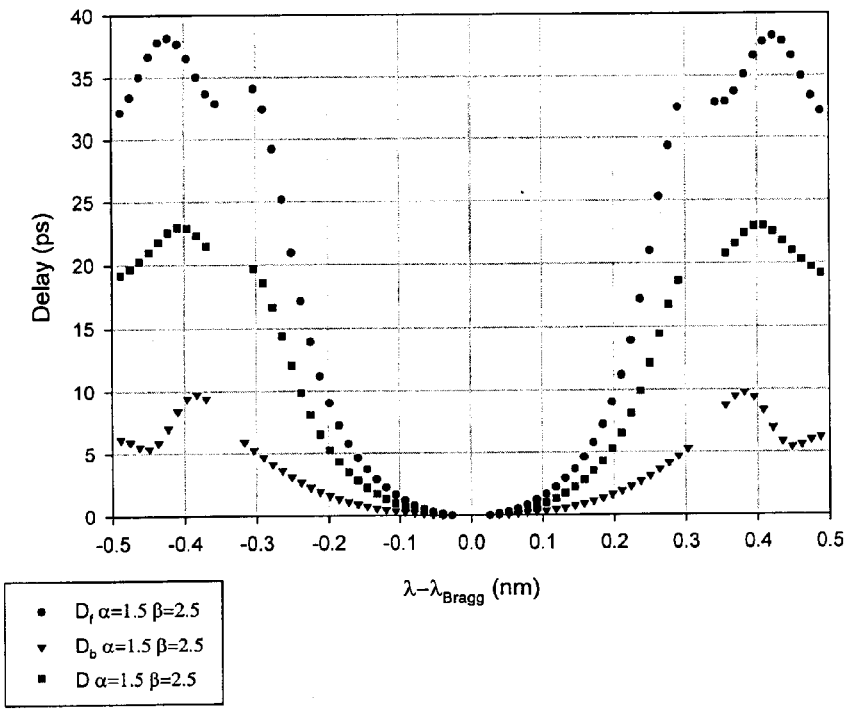
Figure 10:
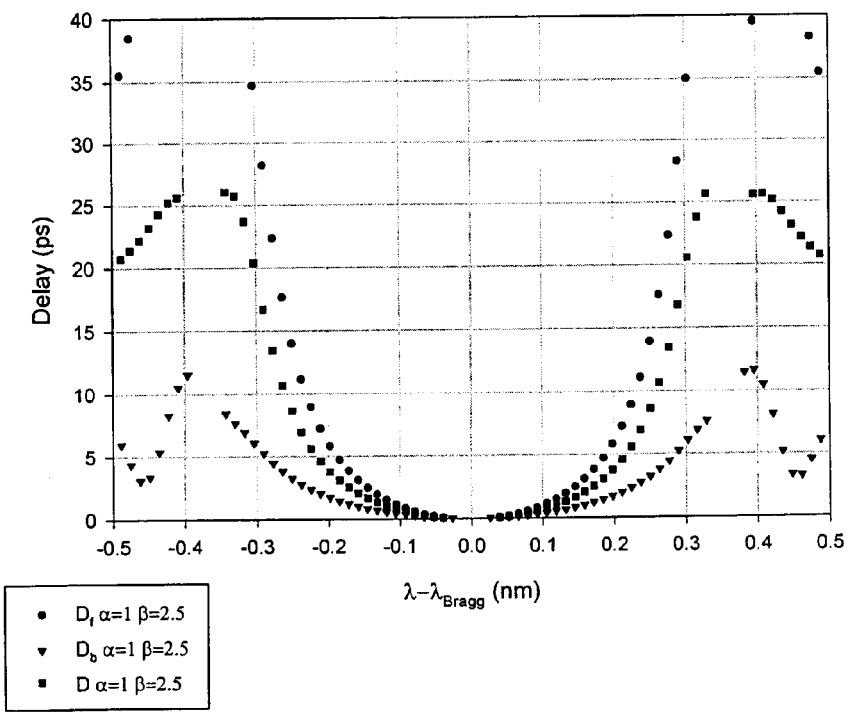
Figure 11:
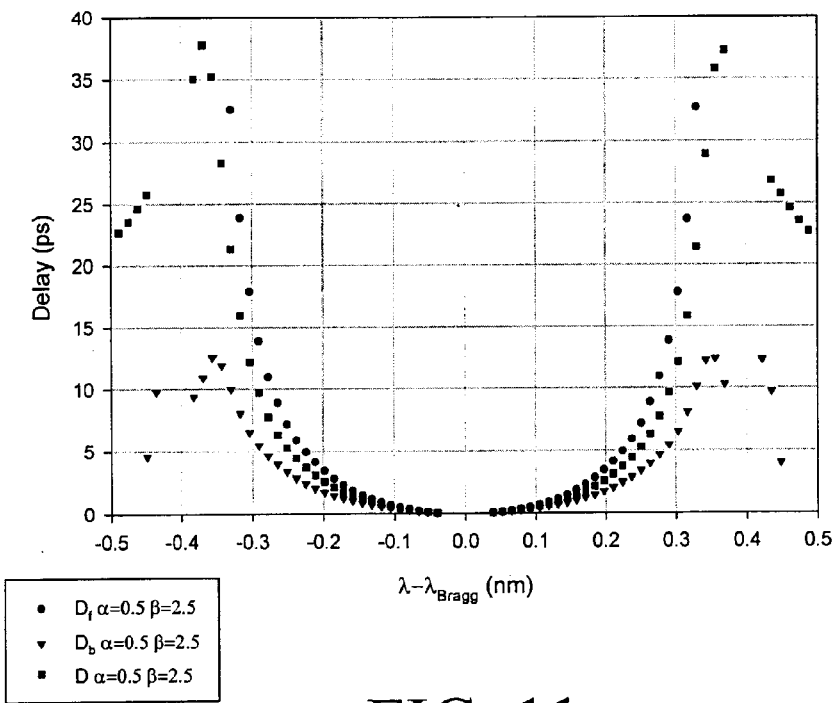

FIG. 8 illustrates how variation in the shape of the index causes a change in the delay exhibited by the grating. Three delay curves are shown for an asymmetric Bragg grating (where $\alpha=2$ and $\beta=2.5$). $D_f$ is reflection delay for light coming from right and $D_b$ is reflection delay for light coming from the left. D is the delay for a symmetric grating with the same amplitude response, where the delay is calculated in accordance with the previously described equation. As shown, $D_b(\omega)$ is significantly decreased as compared to the delay associated with the symmetric grating response $D(\omega)$. While holding β constant at 2.5, α is varied between 1.5, 1.0 and 0.5 in FIGS. 9, 10 and 11, respectively. The improvement of $D_b(\omega)$ in relation to $D(\omega)$ is reduced as a approaches zero and the grating becomes more symmetric. In a symmetric grating, the three delay curves will merge into one delay curve.

Figure 12:
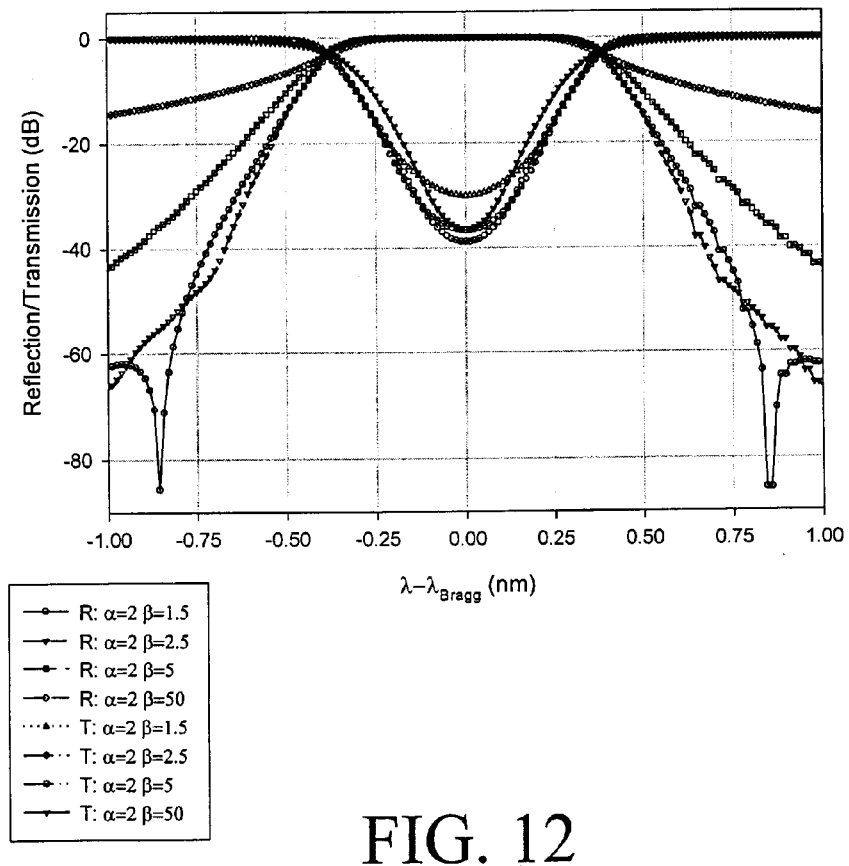
FIG. 12 is a chart showing the transmission and reflection spectrum for different Bragg grating structures in accordance with the present invention.
Figure 13:
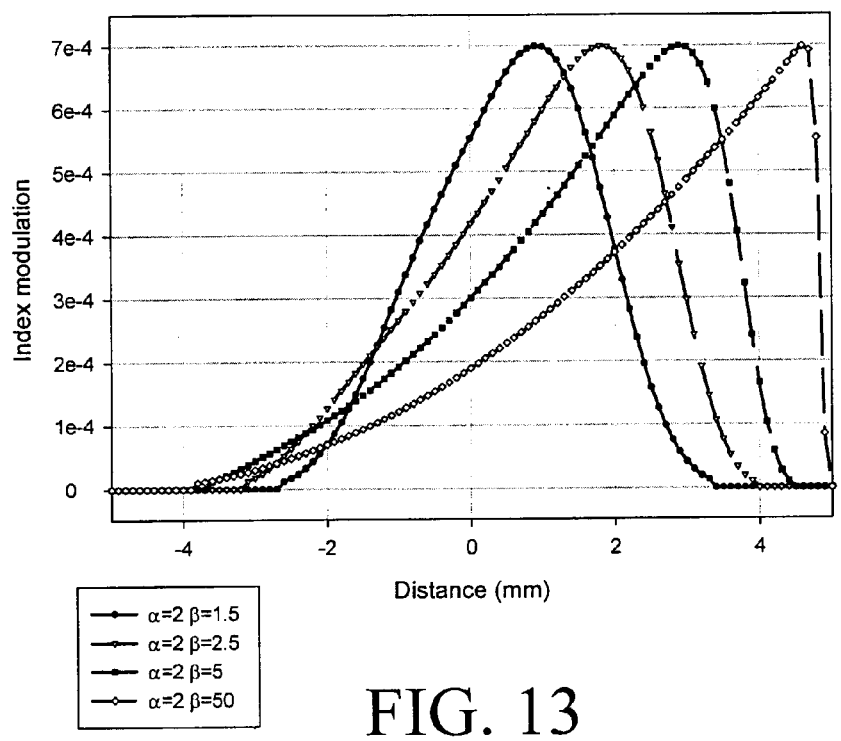
FIG. 13 illustrates how the index modulation peak can be moved further away from the center of the grating in accordance with the present invention.
Figure 14:
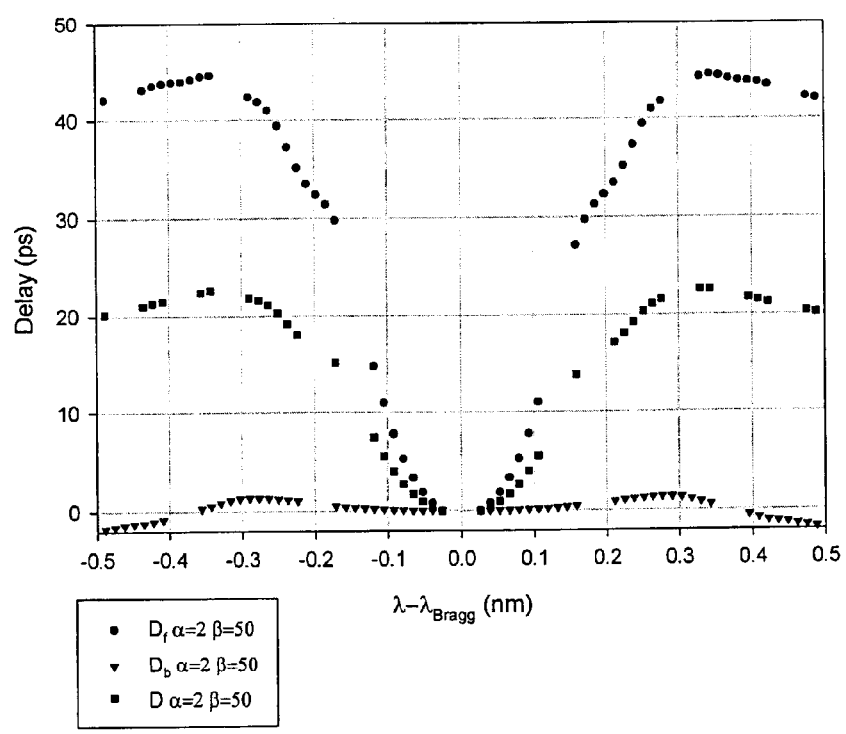
FIGS. 14, 15, 16 and 17 illustrate how the change in the peak of the index modulation causes a variation in the delay exhibited by the Bragg grating structure in accordance with the present invention.
Figure 15:
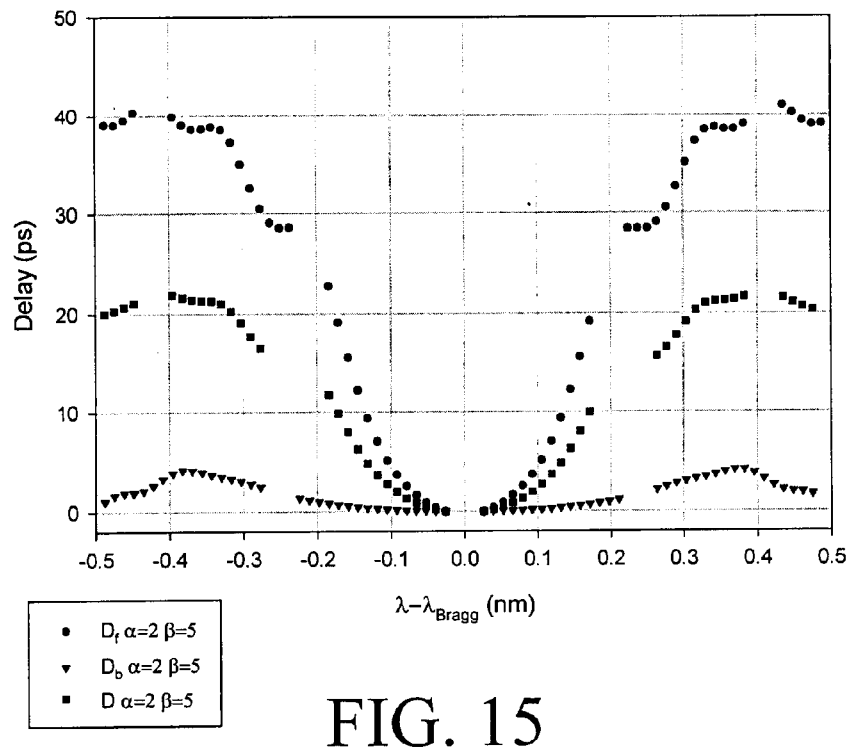
Figure 16:
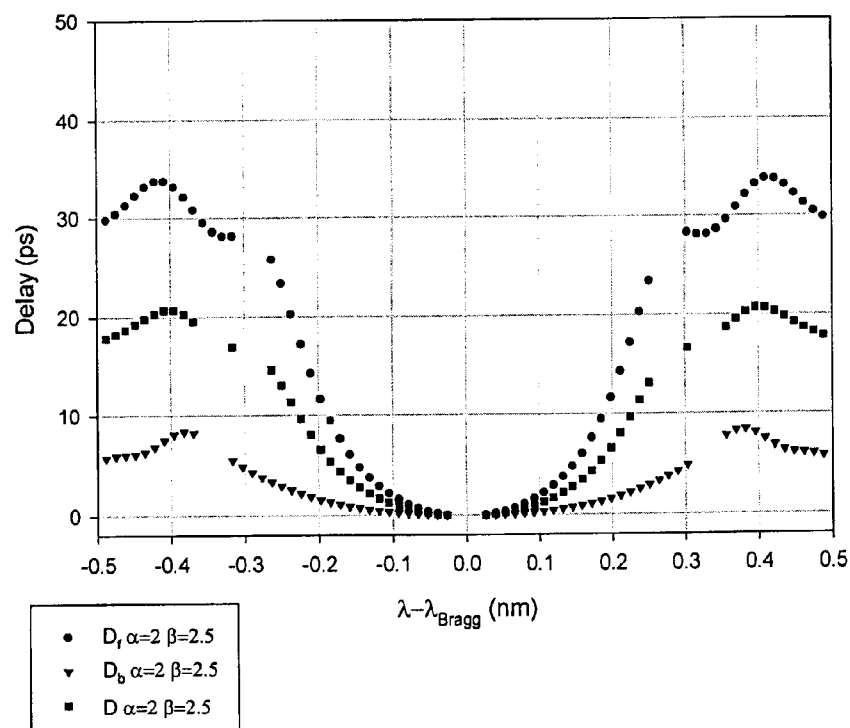
Figure 17:
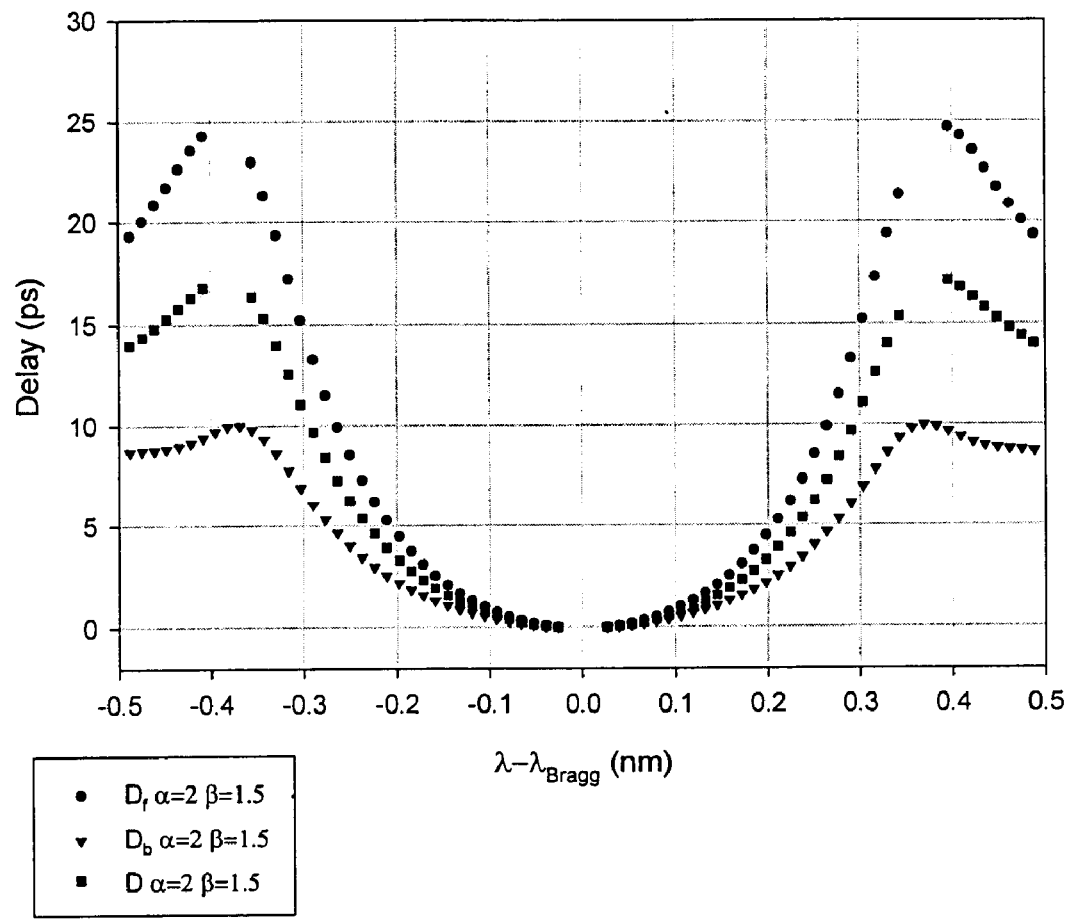

Similarly, FIG. 12 provides the transmission and reflection spectrum for some additional grating structures (where a is fixed at 2.0). It should be noted that the shape of the reflection spectrum is more or less unchanged so long as β remains less than 2.5. However, the fall-off rate of the reflection spectrum is compromised with a larger β characteristic. FIG. 13 illustrates the index modulation for each of the grating structures (i.e., α=2 and β=1.5, 2.5, 5, and 50). As shown, the index modulation peak is moved further away from the center of the grating as β increases.

Because the transmission for each of four different grating structures is similar, the delay for each grating structure can be compared with the delay associated with the other three grating structures. For example, FIGS. 14, 15, 16 and 17 provides the three delays curves for each grating type, i.e., α=2.0 and β=50, 5.0, 2.5, and 1.5, respectively. Again, significant improvement of $D_b(\omega)$ in relation to $D(\omega)$ is seen here, with the extent of improvement decreasing as the grating becomes more symmetric.

From the foregoing, it will be appreciated that the present invention provides an improved delay response over causality limit which can be achieved by introducing asymmetry into the grating structure without degrading the amplitude response of the grating. Such asymmetric gratings opens up new parameter space allowing for a grating structure with fall-off amplitude and low in-band dispersion. Ideally, the present invention can lead to dispersionless-filters. In combination with symmetrical chirp in the grating (asymmetric chirp will lead to asymmetry in filter spectrum), further improvement is expected.

It should also be noted that although asymmetric index modulation is used to demonstrate the principle of the present invention, periodicity variation can also be used to achieve a similar effect or used in combination with the asymmetric index modulation to further improve the filter response. It is also noteworthy that there are instances where a certain constant in-band dispersion is required for a filter instead of zero in-band dispersion, i.e., linear phase response. This can be achieved by varying the period of refractive index modulation linearly along at least part of the grating. In this case, the effect discussed here will cause the dispersion to vary at the band edges.

It will be apparent to those skilled in the art that various modifications and adaptations can be made to the present invention without departing from the spirit and scope of the invention. Thus, it is intended that the present invention cover the modifications and adaptations of this invention, provided they come within the scope of the appended claims and their equivalents.

What is claimed:

1. A reflective optical filter formed in an optical waveguide, the waveguide defined by a first region of higher refractive index and surrounded by a second region of lower refractive index, comprising:

at least one Bragg grating region formed in the optical waveguide, where the Bragg grating region being defined by a pattern of perturbations of the refractive index and the pattern of perturbations having a spatially asymmetric index of modulation, such that the dispersion of reflection is decreased at one end of the grating at the expense of an increase in the dispersion of reflection at the other end of the crating.

2. The reflective optical filter of claim 1 wherein a period of the pattern of perturbations varies linearly in at least part of the Bragg grating regions, thereby providing a constant in-band dispersion for the optical filter.

3. The reflective optical filter of claim 1 wherein the optical waveguide is an optical fiber.

4. The reflective optical filter of claim 1 wherein the optical waveguide is made of a planar substrate.

5. The reflective optical filter of claim 1 wherein the first region of the waveguide is further defined as a core of an optical fiber and the second region of the waveguide is further defined as a cladding of said optical fiber.

6. A Bragg grating filter for use in an optical fiber system, the optical fiber system having at least one optical fiber section defined by a core and a cladding, comprising:

at least one Bragg grating region formed in at least one of the core and at least part of the cladding, where the Bragg grating region having a refractive index;

said Bragg grating region includes a plurality of grating segments, each grating segment having periodic variations in the refractive index and being defined by a spatially asymmetric index of modulation, such that the reflection delay associated with one end of a grating segment is decreased at the expense of an increase in the reflection delay at the other end of the grating segment.

7. The Bragg grating filter of claim 6 wherein a period of the variations in the refractive index varies linearly in at least part of one grating segment, thereby providing a constant in-band dispersion for the filter.

8. The Bragg grating filter of claim 6 wherein the optical waveguide is an optical fiber.

9. The Bragg grating filter of claim 6 wherein the optical waveguide is made of a planar substrate.

10. A method for reducing reflection delay associated with a reflective optical filter, comprising the steps of:

providing an optical waveguide for use as the reflective optical filter, the optical waveguide being defined by a first region of higher refractive index and a second region of lower refractive index;

forming a Bragg grating region into the optical waveguide, the Bragg grating region being defined by a pattern of perturbations into the first region of the optical waveguide, such that the pattern of perturbations having a spatially asymmetric index of modulation; and controlling the reflection delay associated with at least one end of the Bragg grating region by varying the shape of the index of modulation.

11. The method of claim 10 wherein the step of controlling the reflection delay further comprises linearly varying a periodicity of the pattern of perturbations in at least part of the Bragg grating region, thereby providing a constant in-band dispersion for the optical filter.

* * * * *

UNITED STATES PATENT AND TRADEMARK OFFICE
CERTIFICATE OF CORRECTION

PATENT NO. : 6,278,817 B1
DATED : August 21, 2001
INVENTOR(S) : Liang Dong

Page 1 of 1

It is certified that error appears in the above-identified patent and that said Letters Patent is hereby corrected as shown below:

Column 2, claim 1,
Line 6, "crating" should be -- grating --

Signed and Sealed this

Ninth Day of April, 2002

Attest:

Attesting Officer

JAMES E. ROGAN
Director of the United States Patent and Trademark Office